United States Patent [19]

Shaley

[11] Patent Number: 5,143,021
[45] Date of Patent: Sep. 1, 1992

[54] AUTOMATIC ENCLOSURE NEST FOR DOMESTIC FOWL

[76] Inventor: Matti Shaley, 218 St. Andrews Rd., Statesville, N.C. 28677

[21] Appl. No.: 762,196
[22] Filed: Sep. 19, 1991
[51] Int. Cl.$^5$ .............................................. A01K 1/10
[52] U.S. Cl. ..................................................... 119/50
[58] Field of Search ....................... 119/21, 45.1, 45.3, 119/48, 49, 50

[56] References Cited

U.S. PATENT DOCUMENTS

| | | | |
|---|---|---|---|
| 1,037,756 | 9/1912 | Greene et al. | 119/49 |
| 2,108,287 | 2/1938 | Kellum | 119/50 |
| 2,113,859 | 4/1938 | Rowe | 119/49 |
| 2,992,628 | 7/1961 | McDaniel | 119/49 |

FOREIGN PATENT DOCUMENTS

| | | | |
|---|---|---|---|
| 2616622 | 12/1988 | France | 119/45.1 |
| 8702668 | 2/1989 | Netherlands | 119/45.1 |

*Primary Examiner*—Gene Mancene
*Assistant Examiner*—Thomas Price

[57] ABSTRACT

An automatic enclosure nest for domestic fowl which is formed by a frame having side partitions and continuous joining rails, the nest as created by the frame as having a fowl entry and exit and end egg removal end. The entry and exit end permits the entry and exit of the fowl to and from the nest and the egg removal end permitting the removal of the egg laid by the fowl while in the nest. A movable floor positioned within the nest and is inclined when the nest is empty but is moved to a substantially leveled position when a fowl enters the nest and its weight effects the inclination of the floor. The floor returns to the inclined position when the fowl leaves the nest. A trap allows the fowl to enter an empty nest but prevents another fowl from entering the nest when the nest is occupied. An ejector is movable within the nest to force the fowl from the nest through the fowl entry and exit end after a preselected time is passed. A motor driving the ejector to force the fowl from the nest can operate a single nest or a group of nests. Several groups of nests are usually included in the single operation and are programmed to operate in sequence so that there are always nest available for fowls to enter and lay eggs. When a fowl lays an egg in the nest on the substantially level floor and is subsequently removed by the ejector, the floor returns to the inclined position and the egg rolls down the incline through the egg removal end of the egg to an appropriate collection mechanism.

16 Claims, 4 Drawing Sheets

AUTOMATIC ENCLOSURE NEST FOR DOMESTIC FOWL

BACKGROUND OF THE INVENTION

1. Field of the Invention

The present invention relates to enclosures for domestic fowl to encourage the laying of eggs and more particularly to a new and improved automatic enclosure nest for domestic fowl that will include a fowl operable movable nest floor to automatically remove and collect eggs laid by the fowl while in the nest when the fowl has been ejected from the nest.

2. Description of the Prior Art

Various types of enclosure devices developed to encourage the laying of eggs by domestic fowl, particularly turkeys, are known in the prior art. These include devices such as shown in U.S. Pat. No. 4,188,911 wherein a cooperatively operable fowl ejector member and egg removal member operate to remove the fowl from the nest and collect the egg from the nest through the same mechanical arrangement. There are other known automatic rollaway nests for turkeys wherein the turkey will nest on an inclined floor and the laid egg will roll from that floor to a collecting receptacle. In these particular devices, while the floor is inclined, it is not movable and the egg is removed immediately after being laid to the collecting receptacle.

While prior art devices of this nature do have traps and ejectors, they do not have independently operating trap and ejector members. This co-dependence with respect to these two components in some cases restricts the operation of the device and requires a manual intervention to free up the system for continued efficient operation.

Enclosure nests of this nature are usually grouped so that the ejection operation can be simultaneously provided by a single ejector operating means for plurality of nests. The nest configurations usually run from 20 to 30 in number to form a group, and for the most part all groups are operated in unison which results in many instances in a complete nonavailability of nests when all nests are occupied. Such limitations have an impact on the production of eggs and are consequently undesirable.

Prior art enclosure nests are usually of a fixed dimension so that the nest configuration is not susceptible to change in size to accommodate fowl of differing weight and dimensions in different laying coops.

With these considerations in mind, a comparison will now be made between prior art devices discussed previously and the disclosure comprising the present inventive concept.

SUMMARY OF THE INVENTION

The general purpose of the present invention which will be described subsequently in greater detail, is to provide a new and improved automatic enclosure nest for domestic fowl to encourage the laying of eggs which has all the advantages of prior art devices of this nature and none of the disadvantages. To attain this purpose, a representative embodiment of the present invention is illustrated in the drawings and makes use of an enclosure nest having a frame which includes side partitions and continuous joining rails that cooperatively form the enclosure nest and having a fowl entry and exit end and an egg removal end, the entry and exit end permitting the entry and exit of the domestic fowl and the egg removal end permitting the removal of the egg laid by the fowl while in the nest and engages the floor. The floor within the nest is movable from an inclined position assumed when the nest is empty to a substantially level position when the fowl enters the nest. When the fowl leaves the nest, it returns to its previous inclined position by reason of plurality of biased members, preferably springs, that urge the floor upward and back to the inclined position. A trap is positioned to allow the fowl entry to the nest when the nest is empty and to close behind the fowl when it enters the nest to prevent fowl entry so long as the nest is occupied. An ejector is movable within the nest to force the fowl therefrom through the fowl entry and exit end at predetermined intervals. A suitable ejector driving means, usually a motor, actuates the ejector at predetermined time intervals. When the fowl is ejected, the floor returns to the inclined position because of the bias of the springs, and the laid egg will roll over a controlled surface from the nest through the nest egg removal end into a collecting receptacle.

Thus there has been outlined, rather broadly, the most important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting. As such, those skilled in the art will appreciate that the concept upon which this disclosure is based, may readily be utilized as a basis for designing other structures, methods and systems in carrying out the several purposes of the present invention. It is important that the claims be regarded as including such equivalent constructions insofar as they do not depart from the spirit and scope of the present invention.

Further, the purpose of the foregoing abstract is to enable the United States Patent and Trademark Office and the public generally, and especially the scientists and technicians in the art who are not familiar with legal terms or phraseology, to determine quickly from a cursory inspection the nature and essence of the technical disclosure of the application. The application is neither intended to define the invention of the application, which is measured by the claims, nor to limit its scope in anyway. It is, therefore, an object of the present invention to provide a new and improved automatic enclosure nest for domestic fowl to encourage the laying of eggs which has all of the advantages of prior art nests and none of the disadvantages.

It is another object of the present invention to provide a new and improved enclosure nest for domestic fowl which utilizes a depressible floor movable from an inclined position when the nest is empty to a substantially horizontal position when the nest is occupied and back to an inclined position after the nest has been evacuated.

It is a further object of the present invention to provide a new and improved enclosure nest for domestic fowl that will permit adjustable sizing of the nest to accommodate fowl of differing weights and dimensions.

It is another further object of the present invention to provide a new and improved enclosure nest for domestic fowl that includes a trap and ejector which are independent in operation with respect to each other.

It is yet another object of the present invention to provide a new and improved enclosure nest for domestic fowl which includes a trap that is favorably opened operably in a manner not previously utilized.

It is yet still another further object of the present invention to provide groups of nests that can be programmed to operate sequentially and thus assure the availability of empty nests at any time to domestic fowl that are progressively in the process of laying eggs.

These, together with other objects of the invention, along with the various features of novelty which characterize the invention, are noted with particularity in the claims annexed to and forming a part of this disclosure. For a better understanding of the invention, its operating advantages and the specific results obtained by its uses, reference should be made to the following detail specification taken in conjunction with the accompanying drawings in which like characters of reference designate like parts throughout the several views.

BRIEF DESCRIPTION OF THE DRAWINGS

FIG. 7 is a perspective, fragmentary view of the relationship between the bent rods of the trap and the ejector during operation.

DETAILED DESCRIPTION OF THE SPECIFICATION

Figure 1:
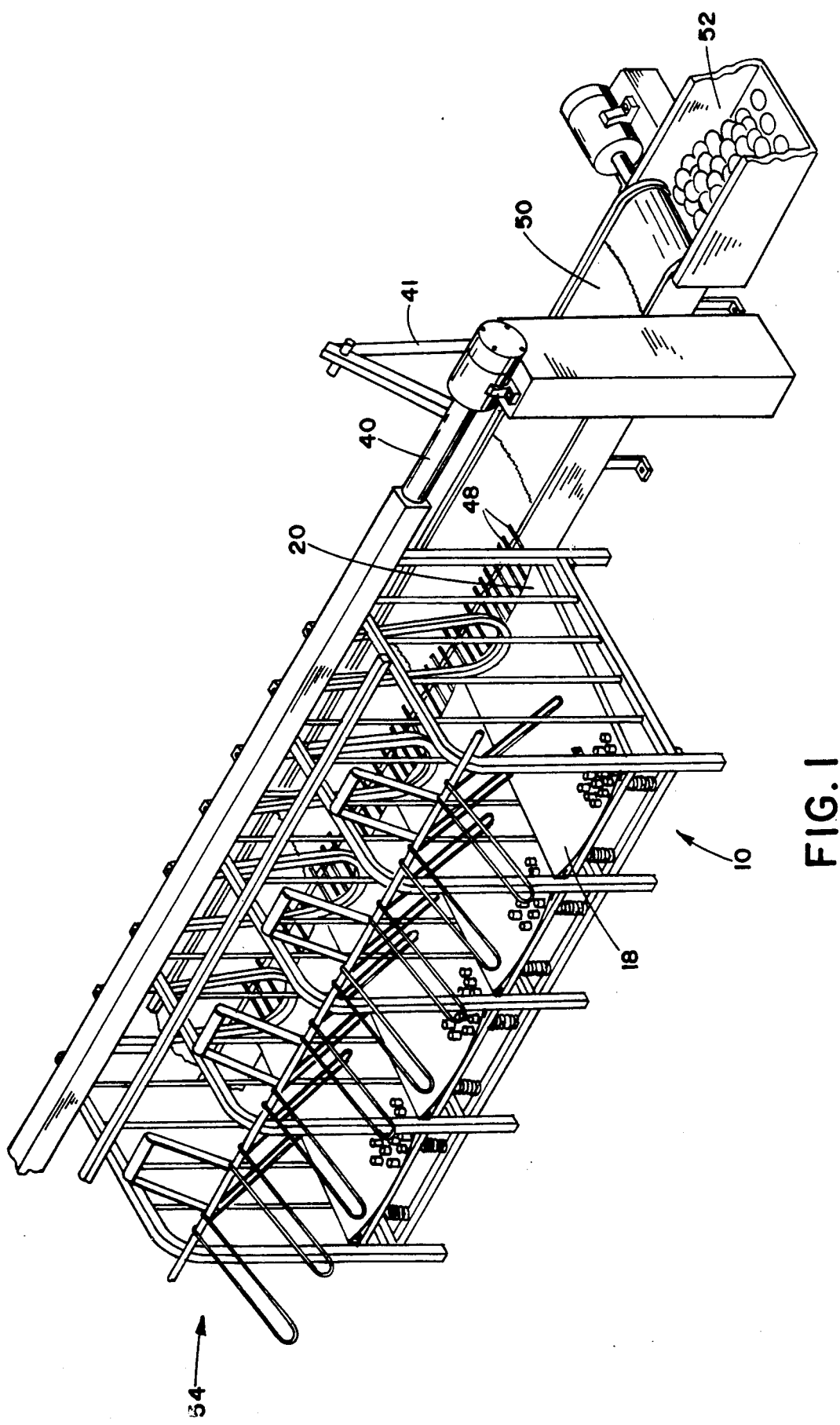
FIG. 1 is a perspective, partial, and fragmentary view of a group of automatic enclosure nests for domestic fowl embodying the significant features of the present invention showing the trap, the inclined floor, the ejector, and the ejector driving means.
Figure 2:
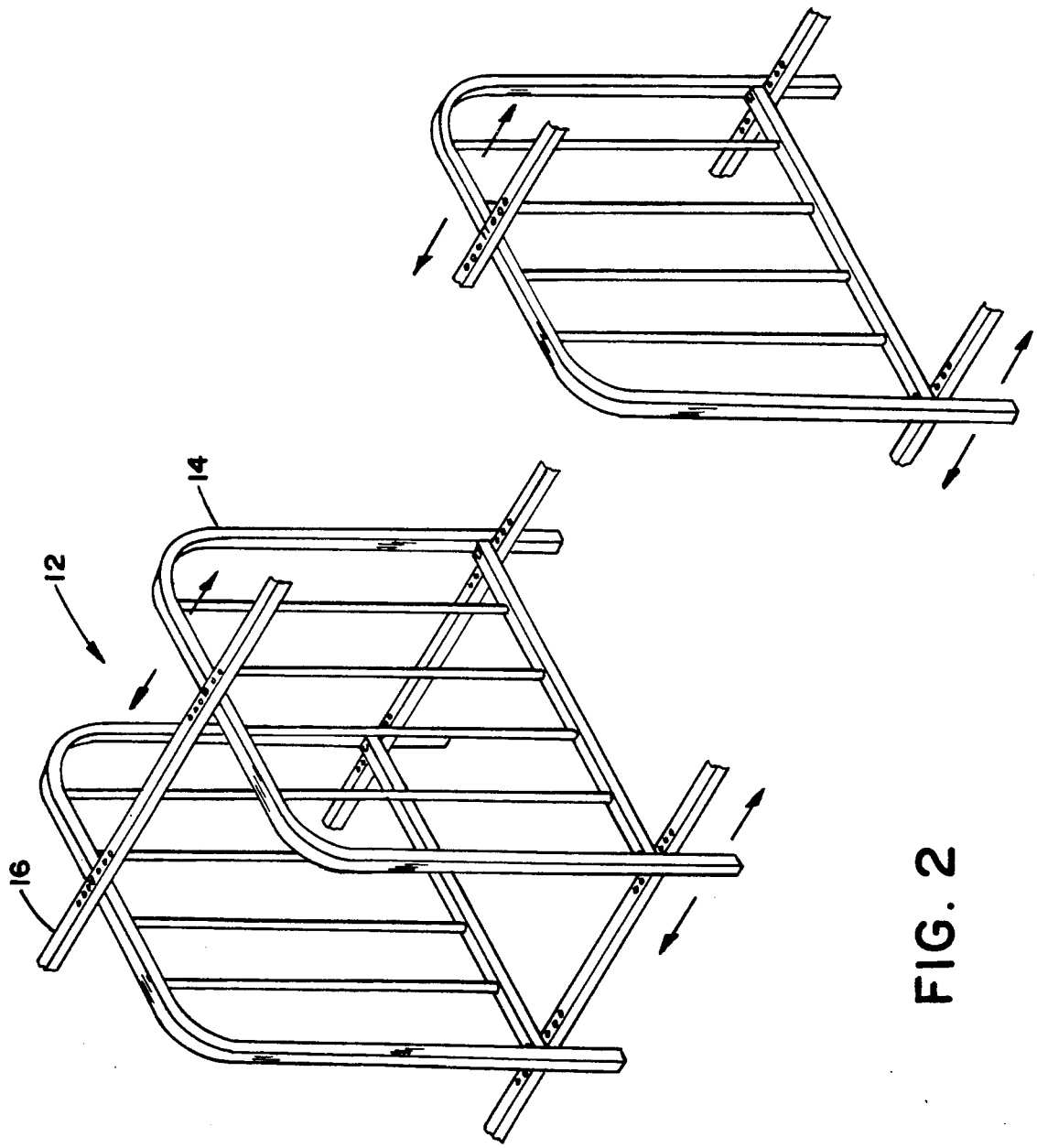
FIG. 2 is a perspective, partial, and fragmentary view of the side partitions and cooperating joining rails of the frame showing the nest size adjustability by having predrilled holes in the rails.
Figure 5:
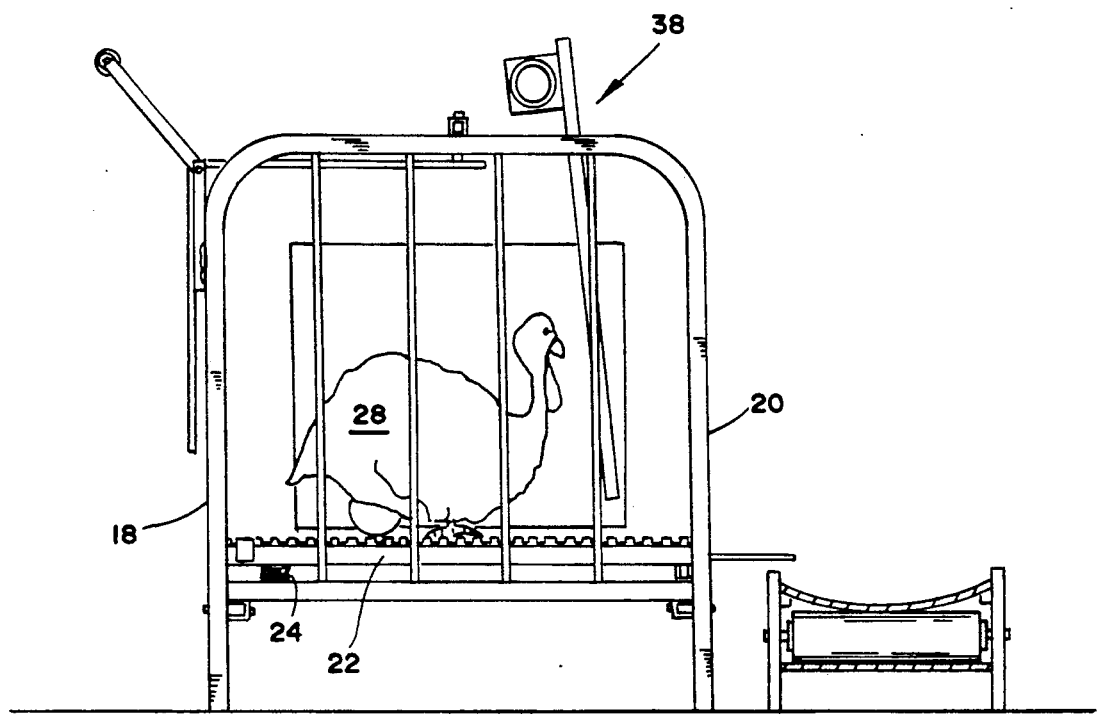
FIG. 5 is a side elevational view of an enclosure nest embodying the significant feature of the present invention showing the positioning of a domestic fowl within the nest to lay an egg and the positions of the trap and ejector when the fowl occupies the nest.
Figure 6:
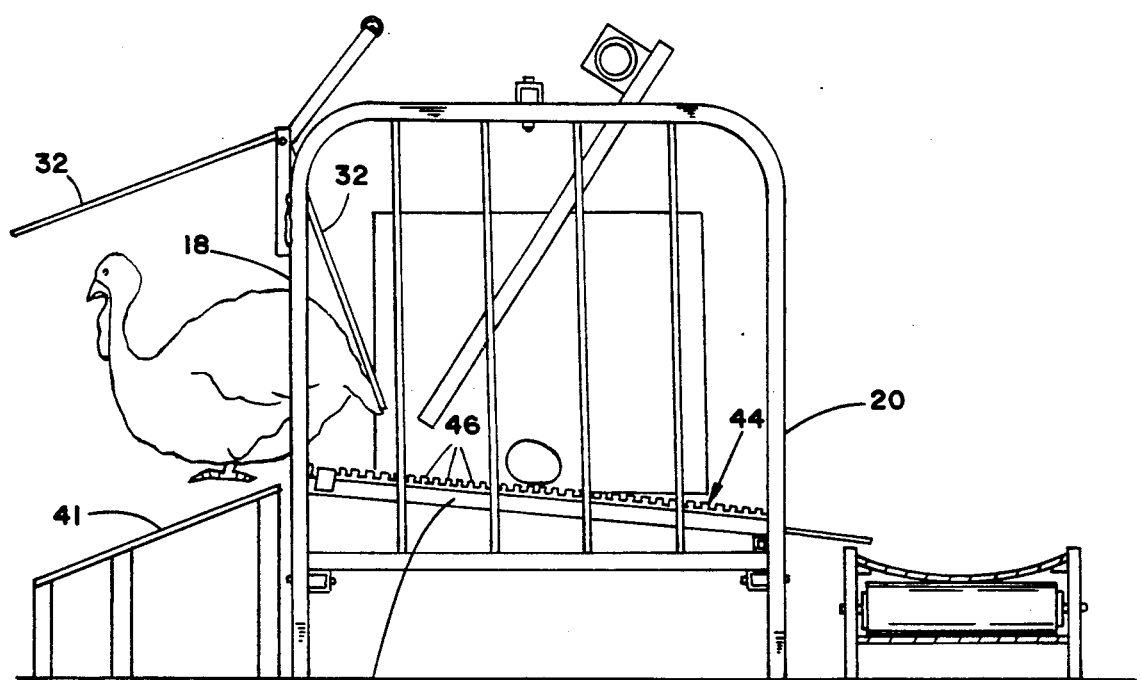
FIG. 6 is a side elevational view of the enclosure nest embodying the significant features of the present invention showing the ejection of the fowl from the nest, the resulting floor movement to an inclined position, the likely movement of the egg toward a collecting receptacle, and the operation of the trap and ejector.

Referring now to the drawings and in particular to FIG. 1, an automatic enclosure nest for domestic fowl designed specifically to encourage the laying of eggs by such fowl, particularly turkeys, is shown generally as 10 and is comprised of a frame shown generally as 12 in FIG. 2 having side partitions 14 and continuous joining rails 16. The nest 12 formed by these components results in a structure that has a fowl entry and exit end 18 and egg removal end 20. The floor 22 (FIG. 3) is movable from the inclined position shown in FIG. 3 to the substantially level position assumed when the fowl enters the nest as shown in FIG. 5. The inclination of floor 22 is caused by springs 24 held in substantial alignment by a rod 26. The weight of the fowl 28 depresses springs 24 so that a substantially level or horizontal position is assumed by floor 22 (FIG. 5).

A trap shown generally as 30 is formed from a plurality of bent rods 32 configured as shown in FIG. 1. These rods are affixed to a pivot member 34 to which is also connected a counter weight 36. Rods 32 are fastened to pivot member 34 to form a 90 degree angle, however, counter weight 36 is fastened to pivot member 34 so as to not bisect the 90 degree angle, but to be offset from such bisection by approximately 10 degrees. The positioning of the counter weight in this manner enables the trap 30 to operate favorably upon its initial engagement by the fowl as it exits the nest. Once the fowl engages depending rod 32 and starts the rotation of the trap about pivot member 34, the location of counterweight 36 causes the trap to continue to move until it closes behind the fowl as it enters the nest (FIG. 5).

Figure 3:
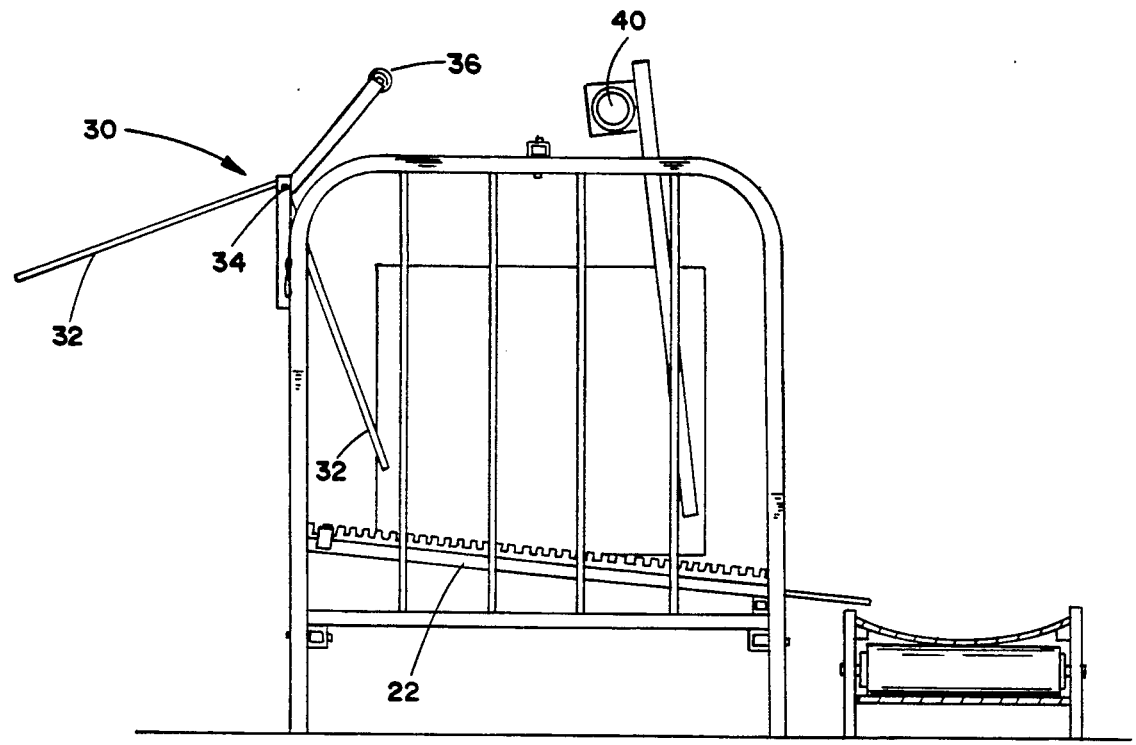
FIG. 3 is a side elevational view of the enclosure nest comprising the present inventive concept showing the positioning of the inclined floor, the trap, and the ejector when the enclosure nest is unoccupied.
Figure 4:
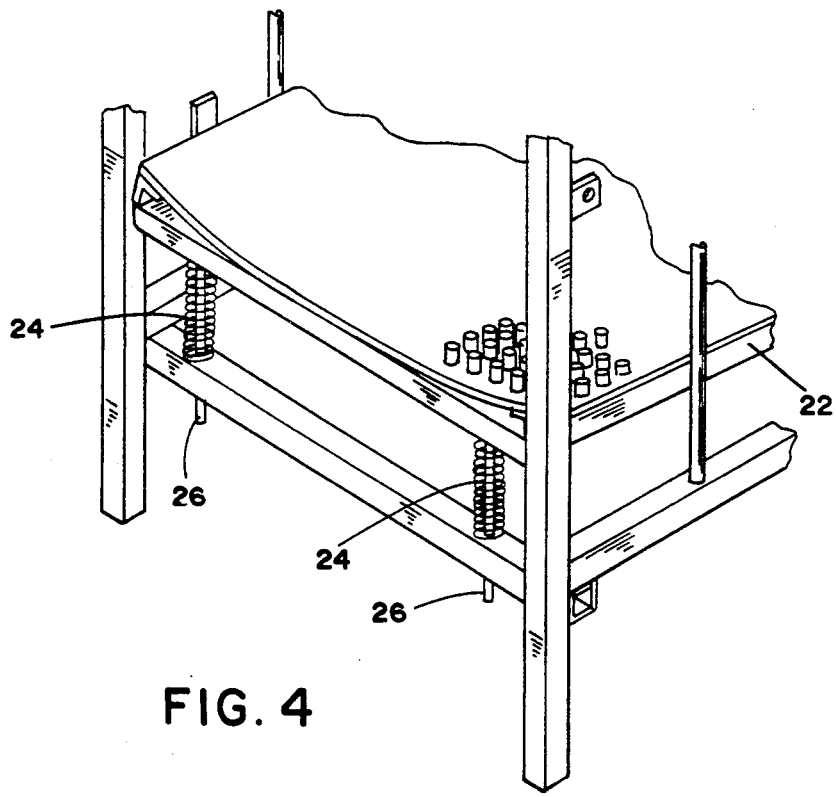
FIG. 4 is a perspective, partial and fragmentary view of a biasing means (springs) causing the floor of the enclosure nest to assume an inclined position when unoccupied by a fowl.

An ejector shown generally as 38 is mounted on shaft 40 as shown in FIGS. 1 and 3. Ejector 38 is moved within nest 10 by the rotation of shaft 40 when driven by motor 42 or some other equivalent prime mover. Motor 42 and shaft 40, are configured to operate at selected time intervals so as to move the ejector 38 through the nest 10 at a given time and force the fowl from the nest to make it available for reentry.

Ejector 38 and trap 30 are independent in operation and are not cooperatively driven or meshed with each other. Both can move freely within nest 10 without engaging any portion of the other.

Floor 22, when in the inclined position, is maintained at an angle to the horizontal within a range of from 10 to 13 degrees with maximum efficiency achieved at an incline of 12 degrees. A ramp 41 leading from the outside of nest 10 to floor 22 is also inclined upwardly at an angle of approximately 12 degrees since this is a comfortable and negotiable angle for the entering fowl to master.

The surface of floor 22 is covered with a resilient material 44. The surface contains a plurality of upwardly extending projections 46 that cushion the egg when it is laid by a fowl. When the fowl leaves nest 10 and floor 22 resumes its inclined position, the egg rolls slowly down floor 22 (being controlled by projections 46) until it reaches receiving rods 48. It assumes a specific position between two such rods and continues a slow movement onto an appropriate receptacle, in the example shown in FIG. 1, a conveyor belt 50 on which it moves until deposited in a bin 52.

In operation, a plurality of nests shown generally as 54 forms a group which is operated by a single shaft 40 as shown in FIG. 1. A representative group comprises 24 nests with 12 being positioned on one side and 12 on the other with the shaft 40 driving all nests from a location between the two sides. A commercial establishment may have, for example, 2400 egg laying fowls, and normal requirements are for one nest to serve 6 fowls.

Thus a total of 400 nests will be required to accommodate 2400 egg laying fowls.

To be certain that there are always nests available for egg laying fowls in such a commercial establishment, it has been found advantageous to sequence the operation of the groups so that there are always nests free to fowls seeking entry.

The operation of the device comprising the present invention and illustrated in the drawings will be apparent from the above description but is summarized hereafter. When a cage is unoccupied, a fowl will walk up the incline 41 and enter the fowl entry and exit end of nest 10. Movable floor 22 responds to the weight of the fowl and assumes a substantially level position. The fowl then lays its egg, however, by nature it tends to remain on the egg for an indefinite period of time until it hatches. To evacuate nest 10, motor 42 actuates shaft 40 which moves ejector 38 through nest 10 and urges the fowl out the entry and exit end 18 of nest 10. Once the fowl leaves the nest, floor 22 assumes its inclined position, and the laid egg rolls slowly down the incline to receiving rods 48 and ultimately to conveyor 50 where it is then conveyed to bin 52 for collection.

Obviously the ejector can be set to operate according to any desired time interval, for example, each half hour, so as to force out the fowls from the nests and immediately remove any eggs laid thereby making the nests available again for entry by other egg laying fowl.

With respect to the above description, it is to be realized that the optimum dimensional relationships for the parts of the invention, to include variations in size, materials, shape, form, function, and manner of operation, assembly in use, are deemed readily apparent and obvious to one skilled in the art, and all equivalent relationships to those illustrated in the drawings and described in the specification are intended to be encompassed herein. Therefore, the foregoing is considered as illustrative only of the principles of the invention. Further, since numerous modifications and changes will readily occur to those skilled in the art, it is not desired to limit the invention to the exact construction and operation shown and described.

All suitable modifications and equivalents that fall within the scope of the appended claims are deemed within the present inventive concept.

What is claimed as being new and what is desired to be protected by letters patent of the United States is as follows:

1. An automatic enclosure nest having an interior for receiving and ejecting domestic fowl comprising: a frame having continuous joining rails and side partitions cooperatively having a fowl entry and exit end and an egg removal end, the entry and exit end permitting the entry and exit of the domestic fowl and the egg removal end permitting the removal of the egg laid by the fowl while in the nest, a floor covering the nest interior movable from an inclined position assumed when the nest is empty to a substantially level position assumed when the fowl enters the nest and lays an egg on the then substantially level floor and back to the inclined position when the fowl leaves the nest, a trap positioned to allow the fowl entry to the nest when the nest is empty and to prevent fowl entry to the nest when the nest is occupied by another fowl; an ejector movable within the nest to force the fowl from the nest through the fowl entry and exit end; and means for driving the ejector to force the fowl from the nest through the fowl entry and exit end whereby an egg laid by a fowl while in the nest on the substantially level floor will roll from the nest through the nest egg removal end when the fowl is forced out of the nest and the floor on which the egg was laid returns to the inclined position.

2. The enclosure nest as claimed in claim 1 wherein the side partitions are adjustably connected to the joining rails to permit the formation of nests of varying widths.

3. The enclosure nest as claimed in claim 2 wherein the trap and ejector are independent in operation with respect to each other.

4. The enclosure nest as claimed in claim 3 wherein the trap is favorably operable so that when the fowl engages the trap to enter the nest the trap nest closing operation continue without continue force until the fowl is closed within the trap.

5. The enclosure nest as claimed in claim 4 wherein the floor is maintained in the inclined position by springs.

6. The enclosure nest as claimed in claim 5 wherein the floor in the inclined position is at an angle to the horizontal within the range of from 10° to 13°.

7. The enclosure nest as claimed in claim 6 wherein the ejector drive means is selectively operable to remove a fowl from the nest at predetermined time intervals.

8. A group of nests as claimed in claim 7 wherein one ejector driving means drives all ejectors of the group.

9. A plurality of nest groups as claimed in claim 7 wherein the ejector driving means of the groups are sequenced to operate to assure the availability of empty nests at any time.

10. The enclosure nest as claimed in claim 1 wherein the trap and ejector are independent in operation with respect to each other.

11. The enclosure nest as claimed in claim 1 wherein the trap is favorably operable so that when the fowl engages the trap to enter the nest, the trap nest closing operation continues without continued force until the fowl is closed within the trap.

12. The enclosure nest as claimed in claim 1 wherein the nest floor is maintained in the inclined position by springs.

13. The enclosure nest as claimed in claim 1 wherein the floor in the inclined position is at an angle to the horizontal within the range of from 10° to 13°.

14. The enclosure nest as claimed in claim 1 wherein the ejector drive means is selectively operable to actuate the ejector and remove a fowl from the nest at predetermined time intervals.

15. A group of nests as claimed in claim 1 wherein one ejector driving means drives all ejectors in the group.

16. A plurality of nest groups as claimed in claim 15 wherein the ejector driving means of the groups are sequenced to operate to assure the availability of empty nests at any time.

* * * * *